(12) United States Patent
Charpentier

(10) Patent No.: US 10,293,871 B2
(45) Date of Patent: May 21, 2019

(54) AIR GUIDING APPARATUS FOR A MOTOR VEHICLE

(71) Applicant: Dr. Ing. h.c. F. Porsche Aktiengesellschaft, Stuttgart (DE)

(72) Inventor: Pierre Charpentier, Stuttgart (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 59 days.

(21) Appl. No.: 15/715,188

(22) Filed: Sep. 26, 2017

(65) Prior Publication Data

US 2018/0093718 A1    Apr. 5, 2018

(30) Foreign Application Priority Data

Oct. 5, 2016 (DE) .................. 10 2016 118 887

(51) Int. Cl.
  *B62D 35/00* (2006.01)
  *B62D 37/02* (2006.01)

(52) U.S. Cl.
  CPC ........... *B62D 35/007* (2013.01); *B62D 37/02* (2013.01); *Y02T 10/82* (2013.01)

(58) Field of Classification Search
  CPC ....... B62D 35/00; B62D 35/007; B62D 37/02
  USPC .......................................... 296/180.1, 180.3
  See application file for complete search history.

(56) References Cited

U.S. PATENT DOCUMENTS

| 7,431,382 B2* | 10/2008 | Vlahovic | B62D 35/007 296/180.5 |
| 7,665,796 B2* | 2/2010 | Wegener | B62D 35/007 296/180.1 |
| 8,991,899 B2* | 3/2015 | Wild | B62D 35/007 296/180.5 |
| 2007/0228771 A1 | 10/2007 | Froeschle et al. | |
| 2007/0236046 A1 | 10/2007 | Froeschle et al. | |
| 2018/0362101 A1* | 12/2018 | Virdie | B62D 35/007 |

FOREIGN PATENT DOCUMENTS

| DE | 102006014260 A1 | 10/2007 | |
| DE | 102006014262 A1 | 10/2007 | |
| DE | 102007025472 A1 | 12/2008 | |
| WO | WO-2008055481 A1 * | 5/2008 | ........... B62D 35/007 |

\* cited by examiner

*Primary Examiner* — Jason S Daniels
(74) *Attorney, Agent, or Firm* — Leydig, Voit & Mayer, Ltd.

(57) ABSTRACT

An air guiding apparatus for a motor vehicle includes an air guiding element and a coupling device configured to positively couple movement of lateral air guiding element sections directed transversely with respect to a longitudinal direction of the vehicle to a movement of the air guiding element between a rest position and an operating position. The coupling device includes a piston configured to be guided in a cylinder in such a way that the piston carries out a rotational movement during a linear movement in the cylinder, and a rotary rocker configured to act on the piston via a cardan joint, configured to also carry out the rotational movement of the piston, and configured to convert the rotational movement of the piston into movement of the lateral air guiding element sections directed transversely with respect to the longitudinal direction of the motor vehicle.

9 Claims, 6 Drawing Sheets

AIR GUIDING APPARATUS FOR A MOTOR VEHICLE

CROSS REFERENCE TO RELATED APPLICATIONS

This application claims benefit to German Patent Application No. DE 10 2016 118 887.5, filed Oct. 5, 2016, which is hereby incorporated by reference herein.

FIELD

The invention relates to an air guiding apparatus for a motor vehicle.

BACKGROUND

DE 10 2006 014 260 A1 has disclosed an air guiding apparatus for a motor vehicle, which air guiding apparatus is arranged in a rear region of the motor vehicle. The air guiding apparatus has an air guiding element which can be moved between a retracted rest position and a deployed operating position. In the retracted rest position, the air guiding element is integrated with a flush surface into the rear region of the motor vehicle. As viewed in the longitudinal direction of the motor vehicle, the air guiding element is divided with the formation of air guiding element sections, in such a way that, during the movement of the air guiding element between the rest position and the operating position, lateral air guiding element sections can additionally be moved transversely with respect to the longitudinal direction of the motor vehicle in a manner which is coupled, namely simultaneously or at the same time, to said movement of the air guiding element.

DE 10 2007 025 472 A1 and DE 10 2006 014 262 A1 have disclosed further air guiding apparatuses for a motor vehicle.

SUMMARY

In an embodiment, the present invention provides an air guiding apparatus for a motor vehicle, the air guiding apparatus being arranged in a rear region of the motor vehicle. The air guiding apparatus includes an air guiding element configured to be moved between a retracted rest position and a deployed operating position, the air guiding element being divided, as viewed in a longitudinal direction of the motor vehicle, with a formation of air guiding element sections in such a way that, during movement of the air guiding element between the rest position and the operating position, lateral air guiding element sections are additionally configured to be moved transversely with respect to the longitudinal direction of the motor vehicle in a manner which is coupled to said movement of the air guiding element; and a coupling device configured to positively couple movement of the lateral air guiding element sections which is directed transversely with respect to the longitudinal direction of the vehicle to the movement of the air guiding element between the rest position and the operating position. The coupling device includes a piston configured to be guided in a cylinder in such a way that the piston carries out a rotational movement during a linear movement in the cylinder, and a rotary rocker configured to act on the piston via a cardan joint, configured to also carry out the rotational movement of the piston, and configured to convert the rotational movement of the piston into the movement of the lateral air guiding element sections which is directed transversely with respect to the longitudinal direction of the motor vehicle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
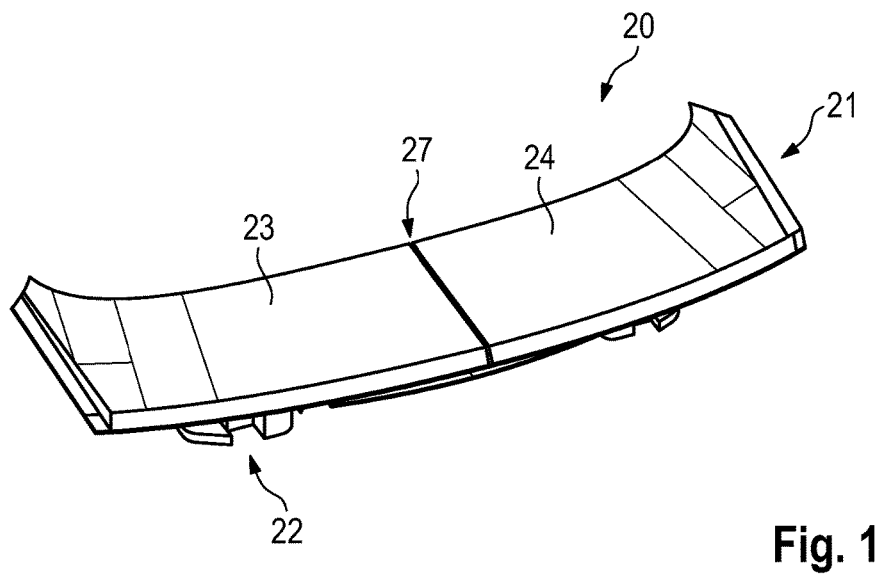
FIG. 1 shows a perspective view of an air guiding apparatus according to an embodiment of the invention in a retracted rest position.

An aspect of the invention provides an air guiding apparatus for a motor vehicle, in which air guiding apparatus, during the movement of the air guiding element between the rest position and the operating position, the lateral air guiding element sections can be moved transversely with respect to the longitudinal direction of the motor vehicle in a reliable manner with low structural complexity and without the necessity of a dedicated drive.

Air guiding apparatuses according to embodiments of the invention have a coupling device for positively coupling the movement of the lateral air guiding element sections which is directed transversely with respect to the longitudinal direction of the vehicle to the movement of the air guiding element between the rest position and the operating position has a piston which is guided in a cylinder, the piston being guided in the cylinder in such a way that the piston additionally carries out a rotational movement during a linear movement in the cylinder. An air guiding apparatus can be, e.g., a spoiler, a wing, or an air dam.

Furthermore, the coupling device of air guiding apparatuses according to embodiments of the invention has a rotary rocker which acts on the piston via a cardan joint, also carries out the rotational movement of the piston, and converts said rotational movement into the movement of the lateral air guiding element sections transversely with respect to the longitudinal direction of the motor vehicle.

An air guiding apparatus according to an embodiment of the invention manages with a single drive which firstly transfers the air guiding element between the rest position and the operating position, and which secondly displaces the lateral air guiding element sections of the air guiding element linearly, in a manner which is positively coupled to said transfer, namely transversely with respect to the longitudinal direction of the motor vehicle. Accordingly, no separate drive is required for the movement of the lateral air guiding element sections transversely with respect to the longitudinal direction of the motor vehicle. Costs and weight of the air guiding apparatus can be reduced as a result.

The coupling device for positively coupling the movement of the lateral air guiding element sections which is directed transversely with respect to the longitudinal direction of the motor vehicle to the movement of the air guiding element between the rest position and the operating position is structurally simple and reliable.

The rotary rocker preferably acts via the cardan joint on an end of the piston, which end protrudes out of the cylinder, the piston having at least one guide pin on a section which is guided in the cylinder, which guide pin is guided in a spiral groove of the cylinder, which spiral groove defines the rotation of the piston relative to the cylinder during the linear movement of the piston in the cylinder. In this way, the positive coupling of the movement of the lateral air guiding element sections to the movement of the air guiding element between the rest position and the operating position can be realized particularly advantageously.

At an end which faces away from that end of the piston which protrudes out of the cylinder, the cylinder preferably acts in an articulated manner on a mounting structure of the air guiding device, via which mounting structure the air guiding apparatus can be mounted on the rear region of the motor vehicle. These features also permit particularly advantageous positive coupling of the movement of the lateral air guiding element sections to the movement of the air guiding element between the rest position and the operating position.

Furthermore, the coupling device preferably has an actuating rod for each air guiding element section, each actuating rod acting with a first end in an articulated manner on in each case one lateral air guiding element section, and each actuating rod acting with a second end in an articulated manner on in each case one laterally outer limb of the rotary rocker. Ultimately, in combination with the rotary rocker, the actuating rod of the coupling device transmits the rotational movement of the piston which is guided in the cylinder into the linear movement of the lateral air element sections transversely with respect to the longitudinal direction of the motor vehicle.

The air guiding element sections of the air guiding element are preferably mounted on a carrier, it being possible for the carrier to be moved, together with the air guiding element sections, during the movement of the air guiding element between the rest position and the operating position, in such a way that the carrier, together with the air guiding element sections, can at least be lifted up and can preferably additionally be tilted via a drive for transferring from the rest position into the operating position, and can at least be lowered and preferably can additionally be tilted for transferring from the operating position into the rest position, it being possible for the lateral air guiding element sections to additionally be moved transversely with respect to the longitudinal direction of the motor vehicle in a manner which is positively coupled to said common movement of the carrier and the air guiding element sections. This provides what is known as a 2D plus air guiding apparatus, in which the air guiding element is moved in the vertical direction and is additionally tilted about a transverse axis of the motor vehicle, which transverse axis extends in the horizontal direction, and in which 2D plus air guiding apparatus the lateral air guiding element sections are moved translationally transversely with respect to the longitudinal direction of the motor vehicle in a manner which is positively coupled to the preceding movement without the necessity of a separate drive.

Figure 2:
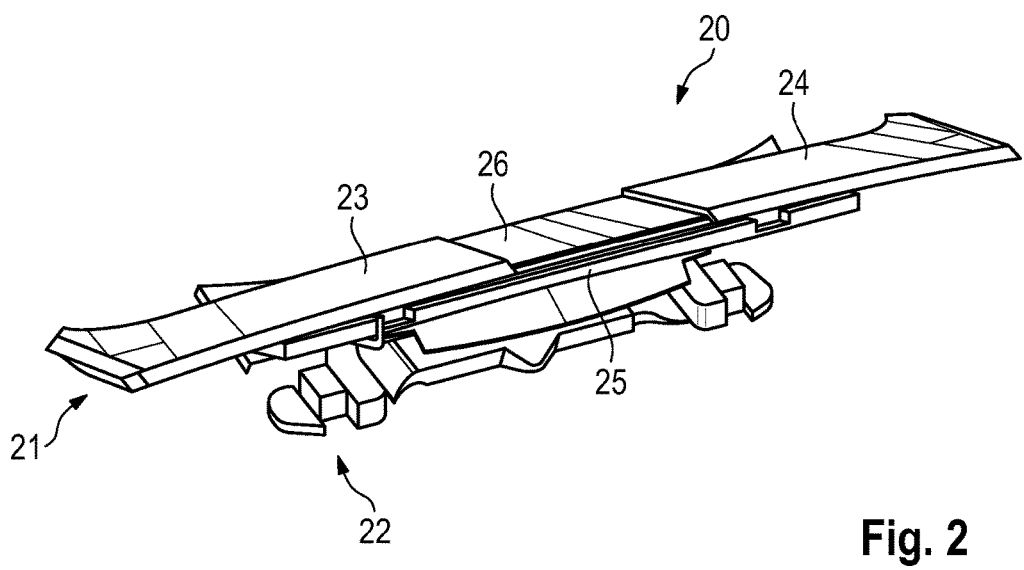
FIG. 2 shows the air guiding apparatus from FIG. 1 in a deployed operating position.

FIGS. 1 and 2 show different views of an air guiding apparatus 20 according to an embodiment of the invention of a motor vehicle, which air guiding apparatus 20 is arranged in a rear region (not shown) of the motor vehicle.

The air guiding apparatus 20 can be moved between the rest position which is shown in FIG. 1 and the operating position which is shown in FIG. 2, the air guiding apparatus 20, namely an air guiding element 21 of the air guiding apparatus 20, being integrated with a flush surface into the rear region of the motor vehicle in the state, in which it is retracted into the rest position.

In addition to the air guiding element 21, the air guiding apparatus 20 has a mounting structure 22, via which the air guiding apparatus 20 can be mounted on a body structure in the rear region of the motor vehicle. The air guiding element 21 of the air guiding apparatus 20 can be moved relative to the mounting structure 22 during the transfer of the air guiding element 20 between the rest position and the operating position.

As viewed in the longitudinal direction of the motor vehicle, the air guiding element 20 is divided with the formation of air guiding element sections 23, 24, 26, to be precise in such a way that, in the retracted rest position, lateral air guiding element sections 23, 24 are moved toward one another with the formation of a parting line 27 which extends in the longitudinal direction of the motor vehicle, whereas, in the deployed operating position, the lateral air guiding element sections 23, 24 are moved toward the outside transversely with respect to the longitudinal direction of the motor vehicle and then release a middle air guiding element section 26 which is covered or concealed by the lateral air guiding element sections 23, 24 in the retracted rest position. The air guiding element sections 23, 24 and 26 of the air guiding element 21 are received on a carrier 25 which, during the movement of the air guiding element 20 between the rest position and the operating position, can be moved together with the air guiding element sections 23, 24 and 26 relative to the mounting structure 22.

During the movement of the air guiding element 21 starting from the rest position which is shown in FIG. 1 into the operating position which is shown in FIG. 2, the air guiding element sections 23, 24 and 26 of the air guiding element 21, together with the carrier 25 of the air guiding element 21, can be lifted up firstly in the vertical direction and secondly can additionally be tilted about an axis which extends in the horizontal direction transversely with respect to the longitudinal direction of the motor vehicle.

During the reverse movement of the air guiding element 21 from the operating position which is shown in FIG. 2 into the rest position which is shown in FIG. 1, the air guiding element sections 23, 24 and 26 together with the carrier 25 can be lowered and can be tilted in the opposite direction about the axis which extends transversely with respect to the longitudinal direction of the motor vehicle.

As has already been stated, the lateral air guiding element sections 23, 24 carry out a movement transversely with respect to the longitudinal direction of the motor vehicle, relative to the carrier 25 and relative to the middle air guiding element section 26 transversely with respect to the longitudinal direction of the motor vehicle, in a manner which is coupled to said movement of the air guiding element 21, in order to increase the transverse extent of the air guiding element 21 in the operating position (shown in FIG. 2) of the air guiding apparatus 20.

In order to move the air guiding element 21 between the rest position and the operating position, the air guiding apparatus 20 comprises a drive (not shown in detail), via which the entire air guiding element 21 together with the carrier 25 can be lifted up or lowered during the movement between the rest position and the operating position, and can additionally be tilted about the axis which extends transversely with respect to the longitudinal direction of the motor vehicle.

The movement of the lateral air guiding element sections 23, 24 relative to the middle air guiding element section 26 and relative to the carrier 25 transversely with respect to the longitudinal direction of the motor vehicle takes place without the necessity of a dedicated drive, in a manner which is positively coupled to the movement of the air guiding element 21 between the rest position and the operating position, to which end the air guiding apparatus 20 comprises a coupling device 28. In a purely mechanical manner without the necessity of a further drive, the coupling device 28 couples the movement of the lateral air guiding element sections 23, 24 transversely with respect to the longitudinal direction of the motor vehicle to the lifting up or lowering and tilting of the carrier 25 and of all air guiding element sections 23, 24, 26 which are received by the carrier 25 during the transfer of the air guiding element 21 of the air guiding device 20 between the rest position and the operating position. Said coupling device 28 will be described in the following text.

The coupling device 28 for positively coupling the movement of the lateral air guiding element sections 23, 24 which is directed transversely with respect to the longitudinal direction of the motor vehicle to the movement of the entire air guiding element 21 between the rest position and the operating position has a piston 30 which is guided in a cylinder 29. The piston 30 is guided in the cylinder 29 in such a way that the piston 30 additionally carries out a rotational movement during its linear movement in the cylinder 29.

In addition, the coupling device 28 has a rotary rocker 32 which acts on the piston 30 via a cardan joint 31, the rotary rocker 32 also carrying out the rotational movement of the piston 30 and ultimately converting the rotational movement of the piston 30 into the translational movement of the lateral air guiding element sections 23, 24 transversely with respect to the longitudinal direction of the motor vehicle and/or transmitting it to the lateral air guiding element sections 23, 24.

Figure 8:
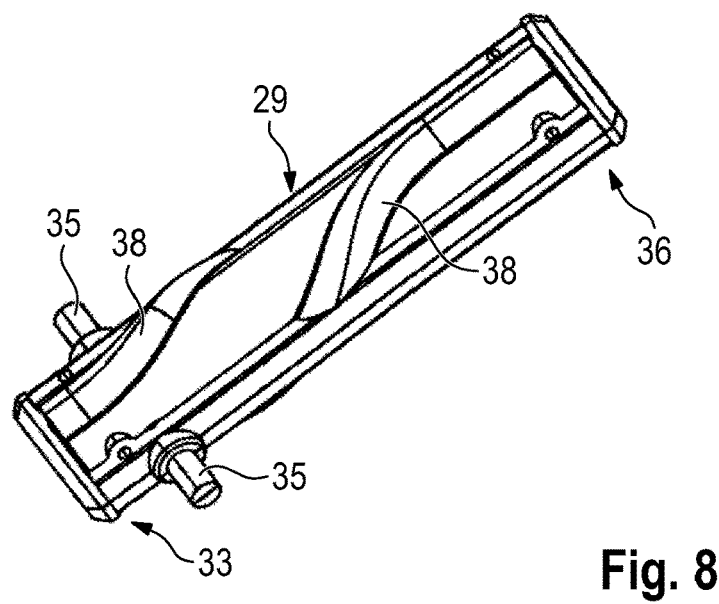
FIG. 8 shows a further detail of the coupling device, namely a cylinder, in a perspective view.
Figure 9:
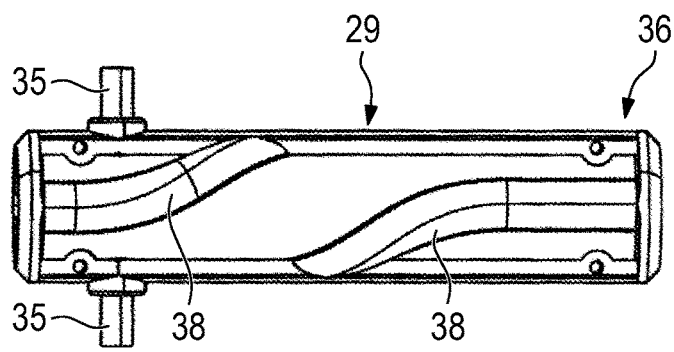
FIG. 9 shows the detail from FIG. 8 in a side view.
Figure 10:
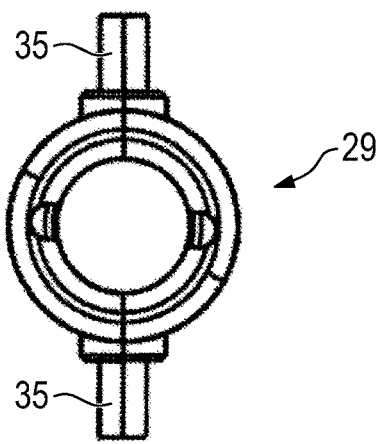
FIG. 10 shows the detail from FIG. 8 in a plan view.

The cylinder 29 of the coupling device 28 which is shown on its own in FIGS. 8 to 10 is attached in an articulated manner at one end 33 to the mounting structure 22 and can be tilted or rotated in the region of said end 33 relative to the mounting structure 22 about an axis which extends horizontally, transversely with respect to the longitudinal direction of the motor vehicle. Said axis is labeled with the designation 34 in FIGS. 3 to 5. Projections 35 of the cylinder 29 which project in the radial direction with respect to the cylinder 29 and are guided in corresponding recesses of the mounting structure 22 define said pivoting movement of the cylinder 29 about the axis 34 relative to the mounting structure 22.

As has already been stated, the cylinder 29 is mounted at its end 33 on the mounting structure 22 such that it can be rotated or pivoted or tilted about the axis 34. At an opposite end 36 of the cylinder 29, the piston 30 is introduced into said cylinder 29 and can be moved linearly out of said cylinder 29 at said end 36, the piston 30 additionally carrying out a rotational movement during said linear movement of the piston 30 in the cylinder 29. Said rotational movement of the piston 30 during its linear movement in a cylinder 29 is predefined by way of the interaction of guide pins 37 of the piston 30 and spiral grooves 38 of the cylinder 29.

In the exemplary embodiment which is shown, the piston 30 has two guide pins 37 of this type on a section or end 39 which is guided permanently in the cylinder 29, which guide pins 37 are offset by 180° with respect to one another in the exemplary embodiment which is shown, each of the two guide pins 37 of the piston 30 being guided in a corresponding spiral groove 38 of the cylinder 29, which spiral grooves 38 define a spiral guide of 180°.

Although two guide pins 37 of this type are preferred, the number of guide pins is of secondary importance. A single guide pin 37 of this type which is guided by way of one spiral groove 38 can also be used.

As has already been stated, the rotary rocker 32 of the coupling device 28 acts in an articulated manner via the cardan joint 31 on the piston 30, namely at an end 40 of the piston 30 which protrudes permanently out of the cylinder 29.

A first section 41 of the cardan joint 31 between the piston 30 and the rotary rocker 32 is provided by that end 40 of the piston 30 which protrudes permanently out of the cylinder 29, and a second section 42 of the cardan joint 31 is provided by the rotary rocker 32.

Furthermore, the coupling device 28 has actuating rods 42, 43. One actuating rod 42, 43 of the coupling device 28 interacts with each lateral air guiding element section 23, 24 of the air guiding element 21 of the air guiding apparatus 20. Here, each actuating rod 42, 43 is attached by way of a first end 44, 45 in an articulated manner to the respective lateral air guiding element section 23 and 24. By way of an opposite second end 46 and 47, the respective actuating rod 42 and 43 acts in an articulated manner on the rotary rocker 32, namely on in each case one laterally outer limb 48 and 49 of the rotary rocker 32.

Here, the two limbs 48, 49 of the rotary rocker 32, on which the actuating rods 42, 43 act by way of the second ends 46, 47, are preferably offset by 180° with respect to one another.

Figure 3:
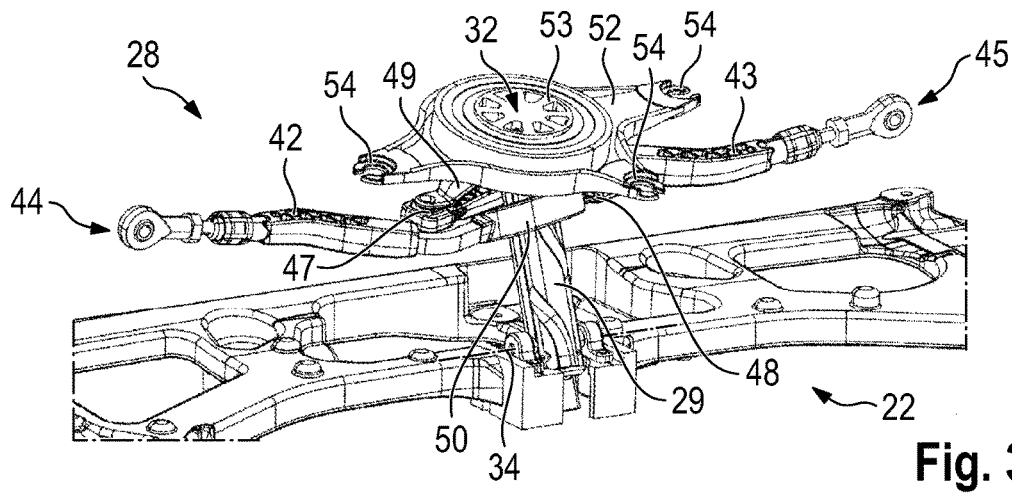
FIG. 3 shows a perspective view of a detail of an air guiding apparatus according to an embodiment of the invention in the region of a coupling device of the air guiding apparatus, in the case of the air guiding apparatus in a retracted rest position.
Figure 4:
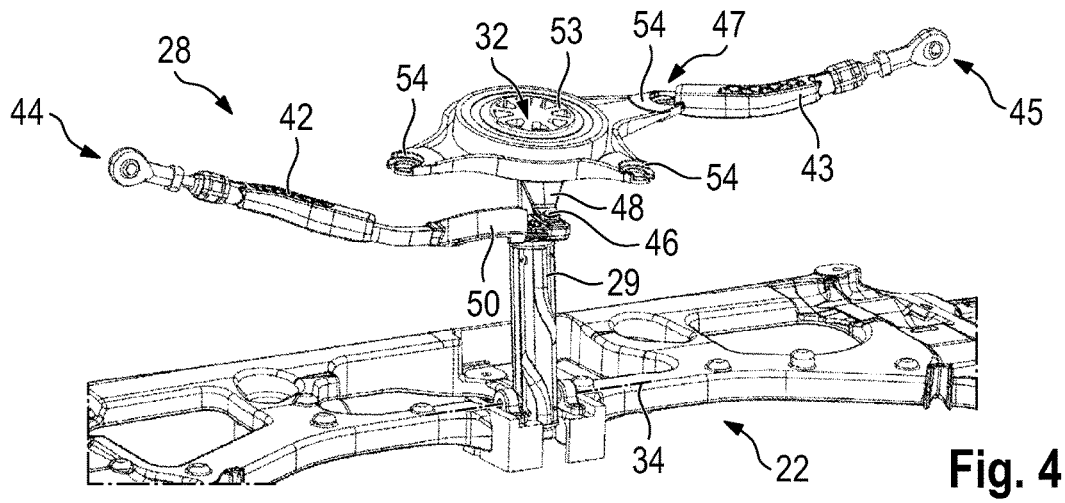
FIG. 4 shows the detail from FIG. 3 in the case of the air guiding apparatus in an intermediate position between the retracted rest position and the deployed operating position.
Figure 5:
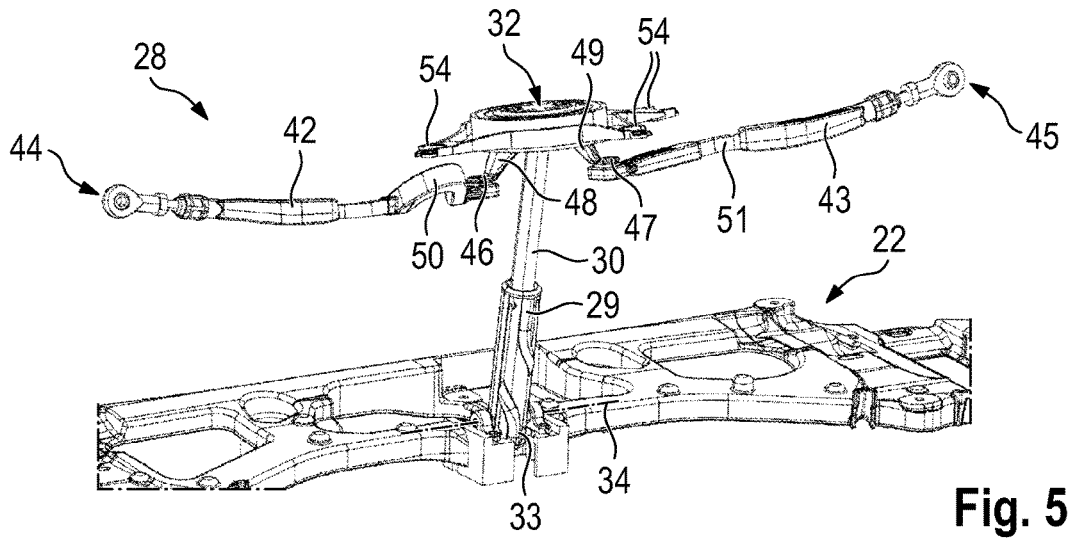
FIG. 5 shows the detail from FIGS. 3 and 4 in the case of an air guiding apparatus in the deployed operating position.

FIG. 3 shows the coupling device 28 in a state, in which the air guiding apparatus 20 or the air guiding element 21 of the former assumes the retracted rest position which is shown in FIG. 1. In contrast, FIG. 5 shows the coupling device 28 in a state which said coupling device 28 assumes when the air guiding apparatus 20 or the air guiding element of the former is transferred into the operating position which is shown in FIG. 2. In FIG. 4, the coupling device 28 assumes an intermediate position, namely an intermediate position between the rest position which is shown in FIG. 1 and the operating position (shown in FIG. 2) of the air guiding element 21.

When the air guiding element 21 of the air guiding apparatus 20 is transferred from the rest position which is shown in FIG. 1 into the operating position which is shown in FIG. 2, the coupling device 28 is transferred from the state which is shown in FIG. 3 into the state which is shown in FIG. 5 in a positively coupled manner.

During the lifting up and tilting of the air guiding element 21 for the transfer of the latter from the rest position into the operating position, the cylinder 29 is accordingly pivoted or tilted about the axis 34, the piston 30 at the same time being extended linearly out of the cylinder 29, and the piston 30 carrying out a rotation by 180° here as a result of the interaction of the guide pins 37 of said piston 30 with the spiral grooves 38 of the cylinder 29.

The rotary rocker 32 of the coupling device 28 which acts in an articulated manner via the cardan joint 31 on that end 40 of the piston 30 which protrudes out of the cylinder 29 also carries out said rotational movement, with the result that the rotary rocker 32 and therefore also the limbs 48, 49 thereof, just like the piston 40, also carry out a rotational movement by 180°.

It can be gathered from FIGS. 3 to 5 that said rotational movement of the piston 30 and of the rotary rocker 32 is converted into a translational movement of the actuating rods 42, 43, with the result that the lateral air guiding element sections 23, 24 are ultimately moved translationally transversely with respect to the longitudinal direction of the motor vehicle in a manner which is positively coupled to the transfer of the air guiding element 21 between the rest position and the operating position.

During the rotation of the rotary rocker 32, the second ends 46, 47 of the actuating rods 42, 43 which act in an articulated manner on the limbs 48, 49 of the rotary rocker 32 are also moved along a circular segment path which is predefined by way of the rotational movement of the limbs 48, 49 of the rotary rocker 32. In order to rule out a collision of the actuating rods 42, 43 with the piston 30 here, sections 50, 51 of the actuating rods 42, 43 which adjoin the second ends 46, 47 of said actuating rods 42, 43 are contoured in a curved manner.

It can be gathered from FIGS. 3 to 5 that the rotary rocker 32 is received or mounted on an element 52. A pot-like section 53 of the actuating rocker 32, on which the limbs 48, 49 act, is inserted here into a recess of the element 52, to be precise with the formation of a joint between the rotary rocker 32 and the element 52. The element 52 per se is connected fixedly to the carrier 25, with the result that a relative movement between the rotary rocker 32 and the element 52 is possible during the transfer of the air guiding element 21 and of the carrier 25 between the rest position and the operating position.

FIGS. 3 to 5 show three projections 54 by way of example, via which the element 52 is attached fixedly to the carrier 25.

Figure 11:
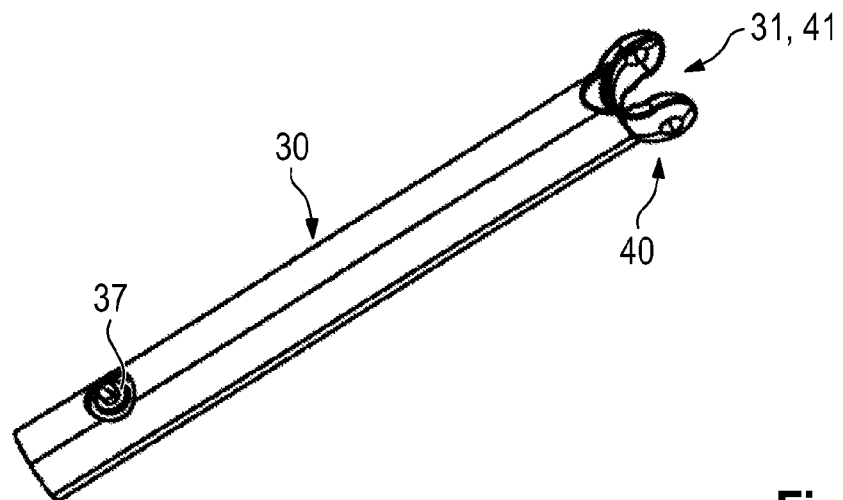
FIG. 11 shows a further detail of the coupling device, namely a piston, in a perspective view.
Figure 12:
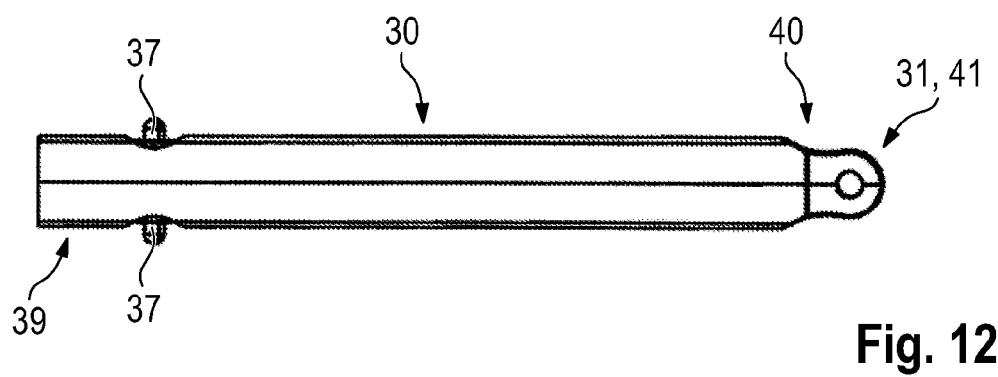
FIG. 12 shows the detail from FIG. 11 in a side view.
Figure 13:
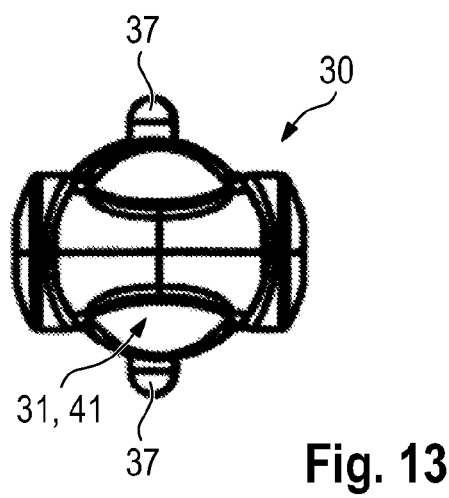
FIG. 13 shows the detail from FIG. 11 in a plan view.

Accordingly, the coupling device 28 of the air guiding apparatus 20 according to an embodiment of the invention which brings about the positive coupling of the movement of the lateral air guiding element sections 23, 24 which is directed transversely with respect to the longitudinal direction of the vehicle to the movement of the air guiding element 21 between the rest position and the operating position utilizes the piston 30 which can be moved out of the cylinder 29 and continues to carry out a rotational movement relative to the cylinder 29 during its linear movement relative to the cylinder 29. Said rotational movement between the piston 30 and the cylinder 29 during the linear relative movement between the piston 30 and the cylinder 29 is provided by way of the guide pins 37 (visible in FIGS. 11 to 13) of the piston 30 in interaction with the spiral grooves 38 (shown in FIGS. 8 to 10) of the cylinder 39. The rotary rocker 32 acts via the cardan joint 31 on the piston 30, the actuating rods 42, 43 for the lateral air guiding element sections 23, 24 acting in an articulated manner on the rotary rocker 32. Accordingly, no separate drive is required for ensuring the retraction or deployment of the lateral air guiding element sections 23, 24 during the movement of the air guiding element 21 between the rest position and the operating position; rather, a drive is sufficient which moves all air guiding element sections 23, 24, 26 of the air guiding element 21 together with the carrier 25 jointly between the rest position and the operating position.

In a manner which is positively coupled to this, the coupling device 28 brings about the movement of the lateral air guiding element sections 23, 24 transversely with respect to the longitudinal direction of the motor vehicle, namely during the deployment of the air guiding apparatus into the operating position with an increase in the transverse extent of the air guiding element 21 and during the retraction of the air guiding apparatus into the rest position with a reduction in the transverse extent of the air guiding element 21.

Here, the piston 30 which can be moved linearly in the cylinder 29 and can be rotated at the same time in the process utilizes the principle of a twisting rod which, during the movement of the air guiding element 21 between the rest position and the operating position, is not only moved linearly in the cylinder 29, but rather is additionally also rotated, in order to rotate the rotary rocker 32 as a result of this and also to move the lateral air guiding element sections 23, 24 translationally transversely with respect to the longitudinal direction of the motor vehicle as a result of the rotation of the rotary rocker 32.

Figure 6:
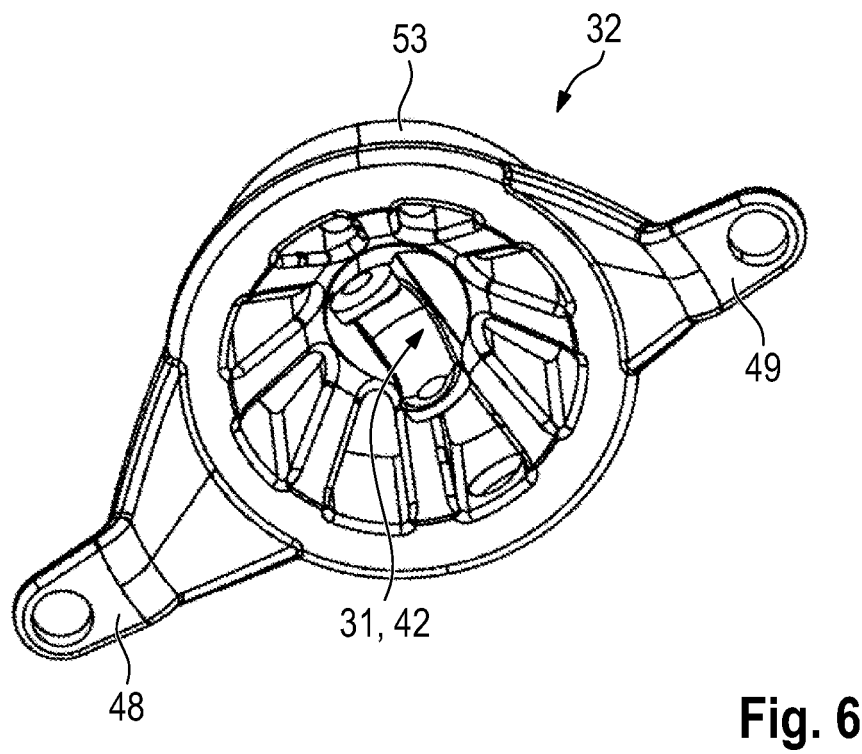
FIG. 6 shows a further detail of a coupling device, namely a rotary rocker, in a perspective view.
Figure 7:
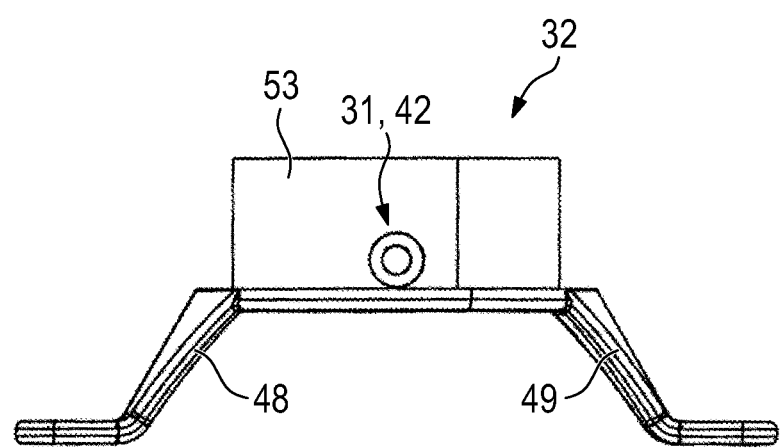
FIG. 7 shows the detail from FIG. 6 in a side view.
Figure 16:
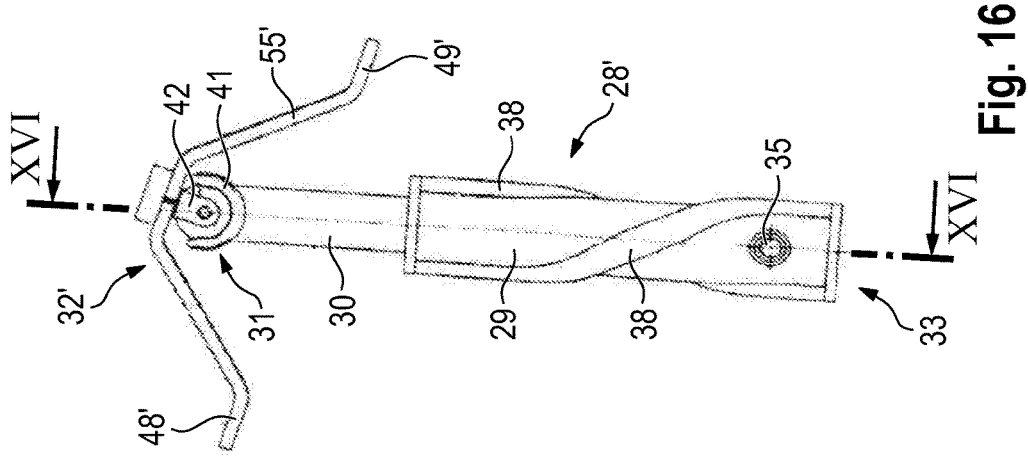
FIG. 16 shows the cross section XVI-XVI from FIG. 15.
Figure 15:
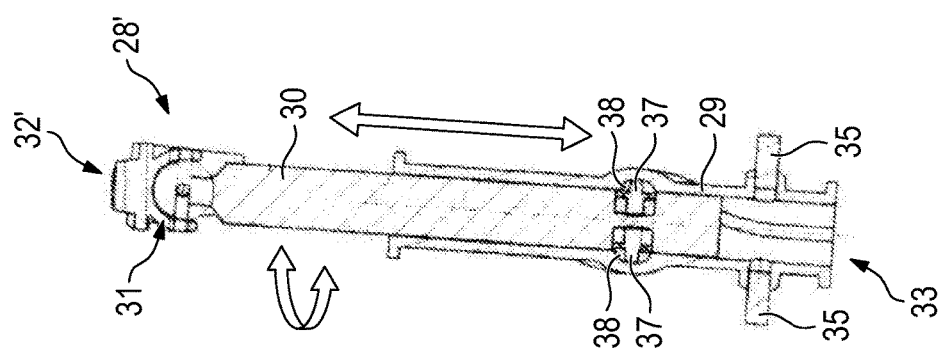
FIG. 15 shows the detail from FIG. 14 in a further state.
Figure 14:
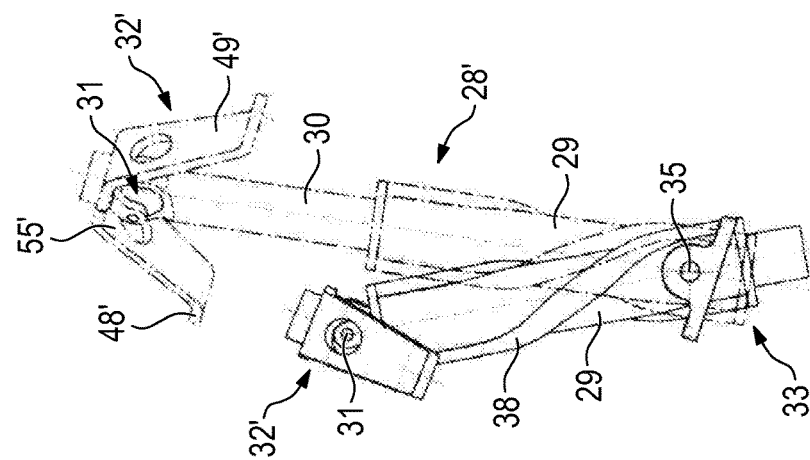
FIG. 14 shows a detail of an alternative coupling device, namely an alternative rotary rocker, a piston, and a cylinder of the coupling device, in two states.

FIGS. 14, 15 and 16 show details from an alternative coupling device 28' in the region of the cylinder 29, the piston 30 and the rotary rocker 32' which is fastened via the cardan joint 31 in an articulated manner to that end 40 of the piston 30 which protrudes out of the cylinder 29, the exemplary embodiment of FIGS. 14 to 16 differing from the exemplary embodiment which is shown in FIGS. 1 to 13 merely by way of the specific configuration of the rotary rocker 32'. The rotary rocker 32' of the exemplary embodiment from FIGS. 1 to 13 which is shown in detail in FIGS. 6 and 7 has, for the articulated attachment of the second ends 46, 47 of the actuating rods 32, 33, the pot-like element 23 which is received in the element 52 in an articulated manner, in addition to the limbs 48, 49 which are offset by approximately 180° with respect to one another.

The exemplary embodiment which is shown in FIGS. 14 to 16 shows a rotary rocker 32' which does not have the pot-like element 53, but rather merely the lateral limbs 48', 49' for the attachment of the actuating rods 42, 43 which are offset by approximately 180° with respect to one another and, in FIGS. 14 to 16, are coupled by way of a web 55' of U-shaped contour which, in its middle section, provides the section 42 of the cardan joint 31.

FIG. 14 shows the elements of the cylinder 29, the piston 30 and the rotary rocker 32' in two different states, namely using solid lines in the case of an air guiding element which is transferred into the rest position and using—dotted lines in the case of an air guiding element which is transferred into the operating position. FIGS. 15 and 16 show said elements in the case of an air guiding element which is transferred into the operating position, the arrows in FIG. 15 visualizing the translational movement of the piston 30 and the simultaneous rotational movement of the piston 30 relative to the cylinder 29 during the transfer of the air guiding element between the rest position and the operating position.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An air guiding apparatus for a motor vehicle, the air guiding apparatus being arranged in a rear region of the motor vehicle, the air guiding apparatus comprising:
   an air guiding element configured to be moved between a retracted rest position and a deployed operating position, the air guiding element being divided, as viewed in a longitudinal direction of the motor vehicle, with a formation of air guiding element sections in such a way that, during movement of the air guiding element between the rest position and the operating position, lateral air guiding element sections are additionally configured to be moved transversely with respect to the longitudinal direction of the motor vehicle in a manner which is coupled to said movement of the air guiding element; and
   a coupling device configured to positively couple movement of the lateral air guiding element sections which is directed transversely with respect to the longitudinal direction of the vehicle to the movement of the air guiding element between the rest position and the operating position, the coupling device including:
      a piston configured to be guided in a cylinder in such a way that the piston carries out a rotational movement during a linear movement in the cylinder, and
      a rotary rocker configured to act on the piston via a cardan joint, configured to also carry out the rotational movement of the piston, and configured to convert the rotational movement of the piston into the movement of the lateral air guiding element sections which is directed transversely with respect to the longitudinal direction of the motor vehicle.

2. The air guiding apparatus as claimed in claim 1, wherein the piston is configured to carry out a rotation by approximately 180° in the cylinder during the movement of the air guiding element between the rest position and the operating position.

3. The air guiding apparatus as claimed in claim 1, wherein the rotary rocker is configured to act via the cardan joint on an end of the piston that protrudes out of the cylinder,
   wherein the piston has at least one guide pin on a section which is guided in the cylinder, the guide pin being guided in a spiral groove of the cylinder that defines the rotational movement of the piston relative to the cylinder during the linear movement of the piston in the cylinder.

4. The air guiding apparatus as claimed in claim 3, wherein the cylinder acts, at an end which faces away from the end of the piston that protrudes out of the cylinder, in an articulated manner on a mounting structure of the air guiding apparatus, via which mounting structure the air guiding apparatus can be mounted on the rear region of the motor vehicle.

5. The air guiding apparatus as claimed in claim 1, wherein coupling device further includes an actuating rod for each lateral air guiding element section, each actuating rod being configured to act with a first end in an articulated manner on, in each case, one of the lateral air guiding element sections, and wherein each actuating rod is configured to act with a second end in an articulated manner on the rotary rocker.

6. The air guiding apparatus as claimed in claim 5, wherein the rotary rocker includes outer limbs on which the actuating rods act, wherein the outer limbs are offset by approximately 180° with respect to one another.

7. The air guiding apparatus as claimed in claim 1, wherein the air guiding element sections of the air guiding element are mounted on a carrier, wherein the carrier is configured to be moved, together with the air guiding element sections, during the movement of the air guiding element between the rest position and the operating position, in such a way that the carrier, together with the air guiding element sections, are configured to be lifted up at least in a vertical direction via a drive in order to transfer the carrier from the rest position into the operating position.

8. The air guiding apparatus as claimed in claim 7, wherein the carrier is configured to additionally be tilted about an axis which extends in a horizontal direction transversely with respect to the longitudinal direction of the motor vehicle, and is configured to be lowered at least in the vertical direction for transferring the carrier from the operating position into the rest position.

9. The air guiding apparatus as claimed in claim 8, wherein the carrier is configured to additionally be tilted about the axis which extends in the horizontal direction transversely with respect to the longitudinal direction of the motor vehicle, wherein the lateral air guiding element sections are configured to additionally be moved transversely with respect to the longitudinal direction of the motor vehicle in a manner which is positively coupled to the common movement of the carrier and the air guiding element sections.

* * * * *